United States Patent [19]

Mutch

[11] 4,335,978

[45] Jun. 22, 1982

[54] INDUCED INTRAGRADIENT SYSTEM FOR SECURE LANDFILL

[76] Inventor: Robert D. Mutch, 17 E. Cedar Pl., Ramsey, N.J. 07446

[21] Appl. No.: 251,820

[22] Filed: Apr. 7, 1981

[51] Int. Cl.³ .......................... B09B 1/00; B65G 5/00
[52] U.S. Cl. .................................... 405/129; 405/54; 210/901
[58] Field of Search ..................... 405/53, 54, 55, 128, 405/129, 258, 270; 210/170, 901; 428/12, 331

[56] References Cited

U.S. PATENT DOCUMENTS 4,068,480  1/1978  Lefever et al. ................. 405/270 X
4,194,855  3/1980  Egger ................................ 405/128

Primary Examiner—Price C. Faw, Jr.
Assistant Examiner—Nancy J. Pistel

[57] ABSTRACT

Induced hydraulic intragardient system for, and method of preventing flow migration of liquid leachate from, a secure landfill arrangement, which contemplates a low permeability inner primary liner for confining liquid leachate containing waste material landfill and a low permeability outer secondary liner for separating the arrangement from the surrounding subsurface formation thereat, and an intermediate permeable piezometric pressure blanket separating the liners from each other, plus a supply mechanism for supplying sufficient control liquid, e.g. potable water, to the pressure blanket to maintain its piezometric pressure head or level higher than that of any leachate accumulation in the waste material confined within the inner liner, for induced hydraulic intragradient counterflow migration of control liquid from the pressure blanket inwardly through the inner liner, whereby to prevent flow migration of such leachate outwardly through the inner liner and in turn to and through the outer liner to the surrounding subsurface formation.

16 Claims, 3 Drawing Figures

INDUCED INTRAGRADIENT SYSTEM FOR SECURE LANDFILL

The present invention relates to a system for and method of preventing leachate flow migration from a secure landfill, and more particularly to such a system and method in which control liquid is used for inducing an intragradient migration inwardly into the landfill.

Arrangements for providing secure landfills or storage facilities for noxious and hazardous waste materials are well known. Their main concerns are generally to minimize the escape of autogenous gases into the atmosphere, the migration of liquid leachate contaminants into ground level water bodies and underground water supplies, and the access of scavaging wild life and insects thereto, and to maximize the stability and relative permanency of the landfill site for future use for other practical purposes, the controlled autogenous decomposition of the waste materials for obtaining innocuous final products or useful by-products, and the relative remoteness of the landfill location from the earth's surface and from surface and subsurface water sources, as the case may be.

Thus, U.S. Pat. No. 4,179,109 (Krutenat) teaches deep bore hole burial of nuclear and other toxic wastes in subterranean basaltic plate locations expected to descend to the center of the earth over a period measured in millions of years, so as to remove such wastes as a present environmental or other risk, whether from earthquakes, human tampering or otherwise.

A simple garbage landfill expedient in U.S. Pat. No. 3,466,873 (Present) is to substitute foamed plastic resin in place of earth fill for covering successive layers of refuse in an open dump facility, thereby sealing in autogenous gases and sealing out moisture as well as providing a barrier to wildlife and insect scavengers.

However, to avoid migration of leachate contaminants which might find their way into nearby water sources, a more elaborate structurally durable vaulting of the noxious and hazardous waste materials is required, such as is suggested in U.S. Pat. No. 4,166,709 (Valiga) in which a bottom outer layer of soil cement, i.e. a mixture of local existing soil and portland cement, is covered with a separate bottom inner layer of soil cement, followed by a bottom water-impermeable film of plastic or bituminous material, whereupon after depositing the waste material thereon, a like top water-impermeable film is added which is sealed at its edges to the bottom film to encapsulate the waste material, then a layer of earth is applied to protect the top film from tearing, followed by one or two more top layers of soil cement, with filler landscape material being finally applied over the resulting mound to provide a natural appearance around the resultant impervious envelope.

Recognizing that any attempt to prevent migration of liquid leachate into the surrounding subsurface formations is really only a temporary measure because of so many adverse and unpredictable factors, U.S. Pat. No. 4,171,921 (Morfeldt) suggests building underground water permeable tunnels beneath the landfill or other waste deposit, designed to enhance preferential drainage thereto of any subsoil water in the vicinity of the deposit for collection and subsequent treatment at a remote plant to remove or render harmless any liquid leachate contaminants from the deposit which may escape into such subsoil water. Such teaching also optionally contemplates the supplying of air under pressure via the tunnels and bores interconnecting the tunnels with the deposit thereabove for enhancing air-assisted biodegradation of waste materials in the deposit, as well as the supplying of clean water under pressure via bores from the ground surface to the tunnels to control horizontal flow of such leachate contaminated subsoil water toward the tunnels.

Less elaborate is the arrangement in U.S. Pat. No. 3,586,624 (Larson) for sloping the bottom liner of a natural rainfall fed accelerated decomposition reaction type waste, e.g. biodegradable rubbish, deposit to form a common drainage channel within the confines of the deposit, and for providing a hollow tile grating on the bottom liner for air circulation, whereby liquid leachate can be drained off and conducted to a remote treatment plant for possible return to the deposit to supplement the rainfall feed, all without objectionable inward migration by osmosis of underground water into the deposit due to the relative impermeability of the bottom liner.

Similar thereto is the teaching in U.S. Pat. No. 3,732,697 (Dickson) of providing a drain well in the bottom of a lined landfill garbage deposit to remove liquid leachate as soon as it accumulates for mixing and compacting with soil to form additional landfill, as the weight of large liquid accumulations adversely affects the impermeable integrity of the bottom portion of the liner and therefore should be avoided.

U.S. Pat. No. 3,874,175 (Winters) concerns the use of a lined container for on site biodegradation of livestock and animal waste, in which portions of the liquid contents thereof are periodically pumped therefrom for removal to a treatment plant or for use as fertilizer, with some recycling of the pumped portions back to the container to enhance agitation of the remaining contents therein.

Because of the inherent vulnerability of all such liner arrangements to deterioration over the passage of time any conventional liner will deteriorate and ultimately become permeable to or exhibit outward flow migration of liquid leachage at least to some extent, the foregoing arrangements are all deficient in preventing absolutely over an indefinite period of time the escape of liquid leachate into the surrounding soil and subsoil.

More specifically, as is clear from the foregoing, the normal practice of secured landfill, or land burial, of hazardous wastes as conventionally carried out is essentially predicated upon the concept of more or less encapsulating or captively enclosing the wastes within an envelope or liner arrangement of low permeability materials with the basic objective of confining or restricting the wastes or their autogenous by-products from release into the environment. This is perhaps most frequently attempted by using composite liner systems formed of highly impermeable polymeric membranes as liners in conjunction with compacted clay soils.

Actual and anticipated governmental regulations dictate in most cases that the secure landfill be constructed above the ground watertable. Very often the hydrogeologic conditions of a region also mandate that the construction be above the ground water table. Generally, therefore, any release of wastes or autogeneous by-products thereof into the environment from such landfill liner arrangements will forthwith endanger the vicinal ground water table.

In this regard, it is well understood that a hydraulic gradient will develope within the landfill which will necessarily be in a downward or outward flow direction and as such will normally serve to drive accumulating and/or autogenously formed liquid leachate, i.e., any indigenous contaminant-bearing liquid, out from the landfill and into the underlying or laterally adjacent subsoil formation, as the case may be. Although the rate of this flow migration may be exceedingly slow and the time required for the liquid leachate to pass through the liner arrangement may often be very great, ultimately such leachate will tend to be released from the landfill even in the case of the most efficient and low permeability composite liner systems.

Even though current state of the art secure landfill designs may commendably contemplate use of compacted clays and like soil materials of the lowest available permeability to liquid leachate in secure landfill constructions together with polymeric membranes and like liquid leachate impermeable materials, in order to minimize the permeability of practicable liner systems, unfortunately polymeric and like impermeable material type membranes have limited proven life spans and compacted clay and like soil material have a low but definitely measurable actual permeability. In short, time is on the side of liquid leachate release well within the life span of the hazardous condition of any so-called static or secure landfill.

Sound secure landfill design also preferably contemplates minimization of liquid leachate accumulation within the landfill in order to reduce the resultant hydraulic gradients therein to the most practicable corresponding minimum level. However, unfortunately in this aspect as well, hydraulic grade under the aforementioned conditions cannot normally be reduced below a practicable minimum value of about 1.0, and even this achievement requires that the liquid leachate be kept to an infinitesimal small level about the liner system.

Accordingly, even under the best of circumstances, a conventional secure landfill arrangement situated above the ground water table will eventually allow some containments, i.e. liquid leachate, to leave its confining envelope or liner system, although the rate of release may be exceedingly small as a result of the very low permeabilities of the materials employed in the envelope or liner system construction. For some wastes and some geologic environments, however, the degree of control afforded by present day secure landfill construction expedients may not be sufficient.

It is among the objects and advantages of the present invention to overcome the above-mentioned drawbacks and deficiencies of the prior art and to provide an improved induced hydraulic intragradient system for, and method of preventing flow migration of liquid leachate, i.e. indigenous contaminant-bearing liquid, from, secure or static landfill arrangements, which contemplate spatial and stable disposition of attendant liner elements in a manner permitting selective control of the piezometric liquid pressure heads or levels at various points in the arrangements, for induced hydraulic intragradient counterflow migration of supplied control liquid, preferably potable water, inwardly through the liner element which directly confines the landfill waste material, whereby to prevent flow migration of any liquid leachate located in the waste material outwardly through such liner element and which would otherwise ultimately escape to the surrounding subsurface formation.

It is among the additional objects and advantages of the present invention to provide a system and method of the foregoing types, in which provision is made for determining, measuring and monitoring the corresponding piezometric liquid pressure heads or levels, induced hydraulic intragradient counterflow migration and flow rate supply of control liquid, degree of impermeability of the liner elements, and possible flow migration of liquid leachate outwardly through such liner element which directly confines it.

It is among the further objects and advantages of the present invention to provide a system and method as stated above, in which provision is made for selectively removing liquid from the arrangement of the attendant liner elements, and for accommodating overflow of excess liquid from the arrangement, especially in the case of an emergency.

It is among the still further objects and advantages of the present invention to provide such a system and method, in which the construction, maintenance and operation of the secure landfill arrangement are effected in efficient, inexpensive, durable, safe and structurally stable manner, as the case may be, and which permit operation for an indefinite, prolonged period without fear of ultimate escape of liquid leachate into the surrounding environment consequent the finite life span of any impervious liner material or the actual permeability of any low permeability liner material which may be used.

Other and further objects and advantages of the present invention will become apparent from a study of the within specification and accompanying drawings, in which.

Figure 1:
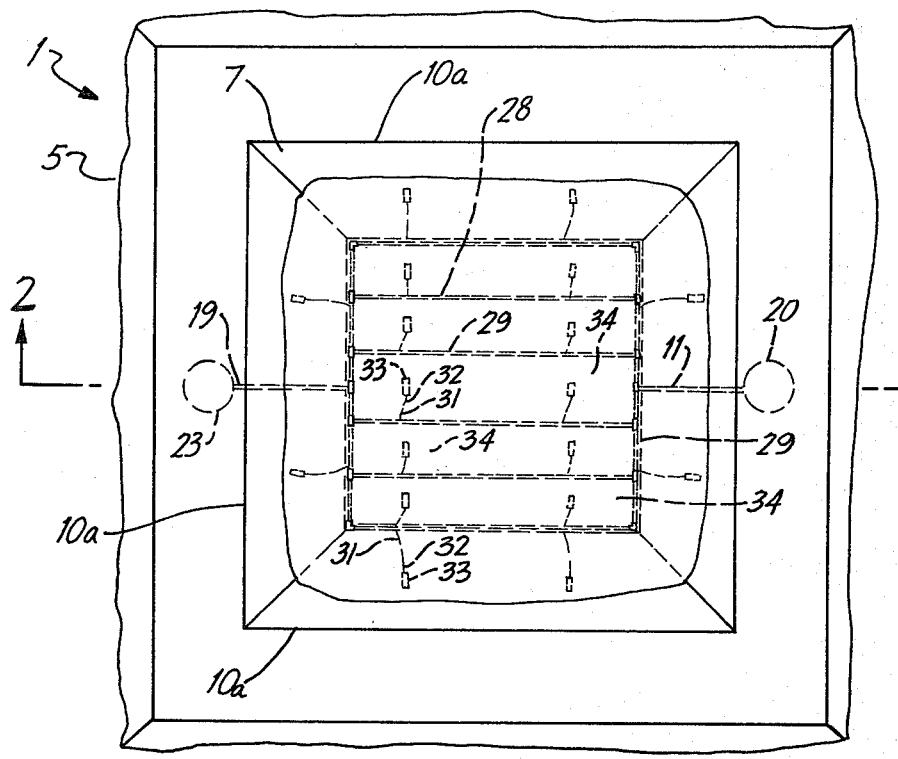
FIG. 1 is a schematic plan view of a secure landfill arrangement provided with the system according to an embodiment of the present invention.

According to one aspect of the present invention, an induced hydraulic intragradient system for a secure landfill arrangement is provided, comprising a low permeability outer secondary liner for confining the primary liner and for separating the arrangement from the surrounding subsurface formation thereat, as well as an intermediate permeable piezometric pressure blanket separating the two liners from each other.

Significantly, control liquid supply means are also provided for supplying sufficient control liquid, such as potable water from any appropriate source, to the pressure blanket to maintain selectively the piezometric liquid pressure head or level therein higher than the corresponding liquid pressure head or level of any leachate accumulation in the waste material confined within the inner liner, for induced hydraulic intragradient counterflow migration of control liquid from the pressure blanket inwardly through the inner layer. This advantageously per se prevents flow migration of any such leachate outwardly through the inner liner and in turn to and through the outer liner to the surrounding subsurface formation.

Pressure sensing means may be advantageously provided for determining the piezometric liquid pressure head or level in the pressure blanket, and flow sensing means may be likewise provided for measuring or determining the flow rate of control liquid supplied to the pressure blanket.

The control liquid supply means may include suitably pressure pumping means for supplying the control liquid to the pressure blanket, as well as outlet access means for removing liquid from the pressure blanket as and if necessary. Moreover, overflow conduit means may be conveniently provided for conducting excess liquid from the pressure blanket in the event of an emergency back flow or overflow or the like.

Preferably, the system of the present invention is disposed along the surface of an open cavity substantially at ground level so as to overlie the surrounding and supportive subsurface formation thereat.

In accordance with a preferred specific feature of the present invention, the pressure blanket is composed of openly packed substantially inert or chemically-resistant loose individual particles forming a structurally stable load bearing permeable medium or bed between the liners sufficient for stably supporting the landfill arrangement and primary liner stationarily thereon.

In this regard, a liquid permeable and solids retaining inner structural sheet of selective very fine porosity is preferably interposed between the inert particles and the inner liner, and a liquid permeable and solids retaining outer structural sheet of selective very fine porosity is likewise interposed between the inert particles and the outer liner, whereby to minimize entry of any solids material from the liners into the permeable medium while permitting substantially unrestricted fluid flow through such structural sheets.

In conjunction with the foregoing structural arrangement, the control liquid supply means may desirably include a flow distribution network of perforated pipes disposed within the pressure blanket for supplying control liquid locally throughout the extent of the permeable blanket.

Furthermore, advantageously, tubes of substantially smaller diameter than that of the perforated pipes may be disposed within such pipes. These tubes may correspondingly terminate at one tube end thereof projecting outwardly through the perforated pipes in pressure sensing means or probes situated at selective distribution points within the pressure blanket, and correspondingly terminate at the opposite tube end thereof in pressure communicating means or indicators situated at an external control location remote from the pressure blanket, for respectively determining the piezometric liquid pressure head or level at such distribution points within the pressure blanket.

According to another aspect of the present invention, a cognate induced hydraulic intragradient method of preventing flow migration of liquid leachate from a secure landfill arrangement is provided.

The method comprises the steps of maintaining a low permeability inner primary liner for confining liquid leachate containing waste material landfill and a low permeability outer secondary liner for confining the primary liner and for separating the arrangement from the surrounding subsurface formation thereat, whereby to provide a secure landfill arrangement; separating the liners from each other by maintaining an intermediate permeable piezometric pressure blanket therebetween; and supplying sufficient control liquid to the pressure blanket to maintain selectively the piezometric liquid pressure head or level therein higher than the corresponding liquid pressure head or level of any leachate accumulation in the waste material confined within the inner liner, for induced hydraulic intragradient counterflow migration of control liquid from the pressure blanket inwardly through the inner liner.

Accordingly, flow migration of such leachate outwardly through the inner liner and in turn to and through the outer liner to the surrounding subsurface formation is correspondingly prevented.

Advantageously, the piezometric liquid pressure head or level in the pressure blanket is periodically determined for monitoring the induced hydraulic intragradient counterflow migration, and likewise the flow rate of the control liquid, preferably potable water as aforesaid, supplied to the pressure blanket is continuously or periodically measured or determined for monitoring the degree of impermeability of the liners.

Also, preferably, the liquid in the pressure blanket is periodically sampled for testing for the presence of leachate therein for monitoring and ascertaining the degree of any migration of leachate outwardly through the inner liner, should such occur.

Figure 2:
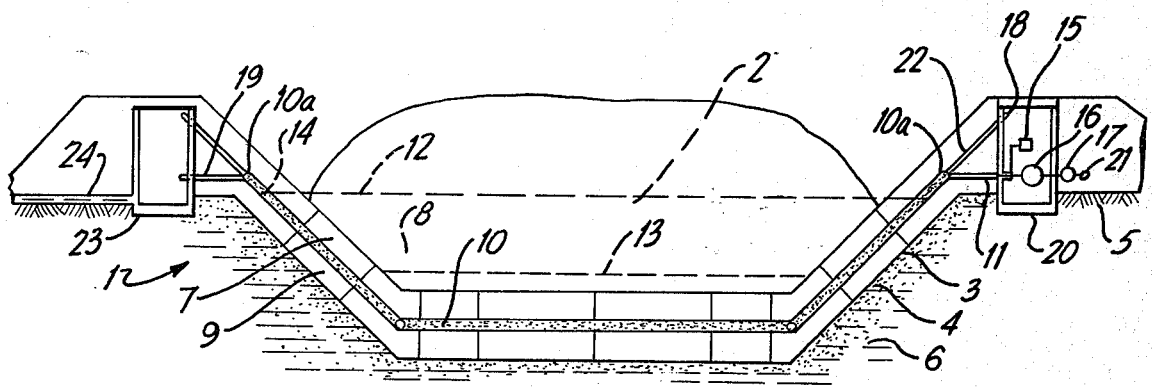
FIG. 2 is a schematic enlarged sectional elevation of such arrangement taken along the line 2—2 in FIG. 1 and shown disposed in a ground level cavity adjacent the surrounding subsurface formation thereat.

Referring to the drawing, and in FIGS. 1 and 2, an induced hydraulic intragradient system 1 for a secure landfill arrangement shown schematically at 2, is provided, for example statically or stationarily disposed along the surface 3 of an open cavity 4 substantially at ground level 5 and overlying the surrounding subsurface formation 6 thereat.

System 1 includes a low permeability inner primary liner 7, e.g. of compacted clay or like soil material, for confining liquid leachate containing waste material landfill or deposit shown schematically at 8, and a low permeability outer secondary liner 9, i.e. likewise of compacted clay or like soil material, for confining the primary liner 7 and for separating the arrangement 2 from the surrounding subsurface formation 6 thereat.

Liners 7 and 9 may be constructed of convential materials in convention manner. However, in system 1, an intermediate permeable piezometric pressure blanket 10 separates the liners 7 and 9 from each other to provide a unique composite interrelated sandwich arrangement.

System 1 also includes control liquid supply means or distribution conduit means 11 for supplying sufficient control liquid, such as pure, uncontaminated or potable water, to the pressure blanket 10 to maintain selectively the piezometric liquid pressure head or level 12 therein higher than the corresponding liquid pressure head or level shown schematically at 13 of any leachate accumulation in the waste material 8 confined within the inner liner 7. This will assure an induced hydraulic intragradient counterflow migration of control liquid from the permeable piezometric pressure blanket 10 inwardly through the inner liner 7, whereby to prevent flow migration of such leachate outwardly through the inner liner 7 and in turn to and through the outer liner 9 to the surrounding subsurface formation 6.

The piezometric level 12 corresponds to the level of the control liquid or water surface shown schematically at 14 which is selectively maintained in the pressure blanket 10, as the artisan will appreciate.

Advantageously, pressure sensing means 15 (FIG. 3) are provided for determining the piezometric liquid pressure head or level 12 in the pressure blanket 10, as well as flow sensing means 16 (FIG. 2) for determining or measuring the flow rate of control liquid selectively supplied to the pressure blanket 10.

The supply means 11 are suitably provided with pressure pumping means 17 (FIG. 2) for supplying control liquid to the pressure blanket 10 under selectively adjustable feed pressure, as well as with outlet access means 18 (FIG. 2) for removing liquid from the pressure blanket 10, should the need arise.

Emergency self-emptying overflow means 19 are also suitably provided for conducting excess liquid from the pressure blanket 10. The level of the overflow means or overflow pipe 19 defines the limit 10a of the pressure blanket 10, as the artisan will appreciate (see FIG. 2).

A laterally disposed and closely adjacent substantially ground level control pit 20 may be suitably provided for accommodating the control liquid or water source 21 for supplying pressure pumping means or pressure pump 17 flow connected with the flow sensing means or flow meter 16 and in turn with the supply means 11 thereat, as well as the outlet access means 18 which is located at the open end of the access stand pipe 22 of the supply means 11 (FIG. 2).

A corresponding oppositely laterally disposed and closely adjacent substantially ground level control pit 23 may also be suitably provided for accommodating the emergency overflow means or overflow pipe 19 for removal of overflow control liquid from the site via the overflow conduit 24 which may lead to any suitable emergency overflow reservoir (not shown) for ultimate disposal, as the artisan will appreciate.

Preferably, the pressure blanket 10 is composed of openly or loosely packed substantially inert individual small inert particles 25 (FIG. 3), such as sand, gravel or other permeable composite mass type material, which form a structurally stable and static load bearing highly permeable composite medium completely filling the intervening space between the inner liner 7 and the outer liner 9 and sufficient to form a bed for supporting the landfill arrangement 2 and the primary or inner liner 7 stationarily thereon in static condition.

Figure 3:
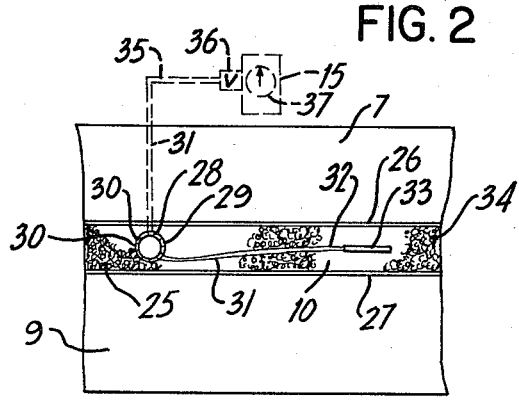
FIG. 3 is a schematic further enlarged sectional view of a portion of the system of the present invention illustrating particular details of construction.

A liquid permeable and solids retaining inner structural sheet 26 is interposed between the inert particles 25 and the inner liner 7, and a like liquid permeable and solids retaining outer structural sheet 27 is interposed between such inert particles 25 and the outer liner 9 (FIG. 3). These sheets 26 and 27 contain very fine pores therein sufficient for unrestricted fluid flow therethrough but of restricted size openings normally below the average size of any solids material present in the liners 7 and 9, e.g. compacted clay or like soil material particles, so as to minimize entry of any such solids material particles from the liners into the permeable medium constituted by the bed of inert particles 25.

Preferably, sheets 26 and 27 are composed of filter fabric or polymeric fabric or the like of fine poresize yet with sufficient structural integrity to withstand the loads in question without tearing.

Such retaining sheets 26 and 27 are especially important where the inner and outer liners 7 and 9 are composed of liner material containing clay or similar particle material packed to provide a low permeability barrier and are also preferably formed of substantially inert material.

As may be seen in FIGS. 1 and 3, the supply means 11 includes a flow distribution network 28 of perforated pipes 29 disposed within the pressure blanket 10 for supplying the control liquid, i.e. via the pipe perforations 30 in such pipes 29, locally throughout the extent of the permeable medium or bed of packed inert particles 25. Also, tubes 31 of substantially smaller diameter (e.g. ⅛ or ¼ inch Teflon tubing) than that of the perforated pipes 29 are conveniently disposed within the perforated pipes 29.

The tubes 31 are distributed throughout the pipes 29 and correspondingly terminate at one, or internal or media, tube end 32 thereof projecting outwardly through adjacent respective perforations 30 in pipes 29 in pressure sensing means or open-ended intake screen porous probes 33 situated at selective distribution points 34 within the pressure blanket 10. The tubes 31 correspondingly terminate at the opposite, or external or distal, tube end 35 thereof in pressure communicating means or, preferably outlet valve containing, open-ended fixtures 36 operatively removably flow connected to pressure sensing means 15, e.g. a fixture 36 attachable portable manual conventional air pump having a pressure gage 37, which is situated at an external control location at control pit 20 remote from the pressure blanket 10 (see FIGS. 2 and 3).

By reason of such tubes 31, which extend from the internal tube ends 32 carrying the pressure sensing probes 34 in suitable direct open-ended pressure sensing flow communication with the control liquid in the pressure blanket 10, via the perforated pipes 29 in the distribution network 28 and in turn ultimately via the control liquid supply means 11, to the external tube ends 35 carrying the open-ended fixtures 36 in suitable direct open-ended pressure flow communication with the attachable air pump 15, the piezometric liquid pressure head or level at each distribution point 34 within pressure blanket 10 may be advantageously respectively determined in conventional manner.

For this purpose, the air pump 15 may be readily detachably connected to each fixture 36 at the corresponding external tube end 35 regarding which the piezometric level at the appropriate distribution point 34 therefor is to be determined, and the air pump operated to measure the hydraulic or liquid pressure head thereat and which per se indicates the particular piezometric level. Since the external tube ends 35 in control pit 20 are above the piezometric level 12, no reverse flow outwardly from the pressure blanket 10 will normally occur, whereas fixtures 36 may be suitably fashioned as manually closable valves to prevent leakage or reverse fluid flow outwardly therethrough when the air pump 15 is not attached thereto and supply means 11 is placed under the delivery feed pressure of pressure pump 17 for supplying control liquid through the perforated pipes 29 to the pressure blanket 10.

The induced hydraulic intragradient system 1 for the secure landfill arrangement 2 according to the present invention is thus based on the recognition that conventional developments in this field of endeavor have essentially progressed to a point of diminishing return in practicable efforts to reduce the permeability of the confining envelope or liner construction for a secure landfill, because despite all such efforts the inevitability of eventual leachate escape still remains, being merely a function of time. In contrast thereto, system 1 and its method of operation focus on a different yet related major factor which influences the release of contaminants in the form of liquid leachate from the landfill obnoxious deposits, i.e. hydraulic grade.

By incorporating the piezometric pressure blanket 10 between the usual primary and secondary liners 7 and 9, or in a three element composite interrelated construction as represented by system 1 in place of a single usual liner or even a double composite liner, in a secure landfill arrangement 2, and supplying control liquid thereto by supply means 11, a reversing of the direction of the hydraulic grade across the critical confining layers or liners is effected. Thus, a positive flow gradient into the landfill itself is set up which results in a perceptibly small or negligible amount of control liquid such as water being induced to flow into the landfill. The attendant extremely low actual permeability of the highly impermeable usual confining layers or liners inherently minimize the rate of this induced inflow, just as the outflow of liquid leachate from a conventional secure landfill is intentionally minimized as discussed above.

Under the described conditions, the secure landfill provided with the system according to the present invention is per se able to prevent indefinitely the migration of contaminants, i.e. liquid leachate, outwardly from the landfill to the subsurface, since all that is necessary is the constant maintaining of the piezometric level in the pressure envelope constituted by the pressure blanket 10 incrementally higher than the corresponding level of leachate accumulation in the landfill. Since leachate levels are routinely controlled at most modern day secure landfills anyway, the operation of the system 1 according to the present invention should not impose any significant burden on the secure landfill operator, and any such burden is a negligible factor considering the obvious benefits achieved and the insurance against ultimate leachate leakage into the subsurface formation at some otherwise determinable yet normally than actually unknown future time.

The piezometric pressure blanket 10 at its most elemental or simple form is essentially a permeable structural medium or bed statically sandwiched between the normal confining layers or liners or sub-layers or sub-liners of a composite envelope or liner arrangement for a secure landfill. The pressure blanket 10 actually functions as a comparatively thin, confined or artesian aquifer, in which the piezometric head can be controlled and regulated by reason of the attendant control liquid supply means 11.

An aquifer, of course, may be defined as a water bearing bed or stratum of earth, gravel or porous stone. The permeable medium constituting the pressure blanket 10 may be advantageously composed of sand, gravel or any other material capable of transmitting piezometric or hydraulic liquid pressure heads, and possessing sufficient composite structural intengrity and stability as well as resistance to chemical attack and deterioration from the constituents indigenous to secure landfills and the contents normally contemplated therein to withstand the otherwise adverse effects thereof, thereby satisfying the function of an effective aquifer fed by the supply means 11.

The piezometric nature of the control liquid containing pressure blanket 10 so constructed inherently lends itself to usage for measuring the loss control liquid and the related usage for measuring the hydraulic intragradient counterflow migration of control liquid induced by the piezometric or hydraulic head or level of such control liquid as supplied by the supply means 11 in the system 1 in question, i.e. in gradient terms of the function of the height and load area differential between the piezometric surface or level 12 of the area of the body of control liquid in the pressure blanket 10 and the leachate level 13 of the area of the body of accumulated liquid leachate in the secure landfill arrangement 2 (see FIG. 2).

Of course, since secure landfills, as distinguished from industrial liquid waste lagoons, are normally low in liquid content as compared with solids content in the waste deposit in question, the slight volume of control liquid contributed thereto via the counterflow system of the present invention will be understandably negligible, whereas use of the instant sytem for containing an industrial liquid waste lagoon, already high in liquid content, will not significantly alter that content especially in those lagoons designed to take advantage of environmental evaporation of innocuous vaporizable constituents to reduce the liquid content therein with time.

It will be appreciated that the inclusion of the network 28 of perforated pipes 29 will enhance immediate local distribution and dissemination of piezometric pressures throughout the pressure blanket 10, i.e. without dependence upon possible local fluctuations in the porosity of the permeable medium as might occur in the bed or stratum of sand, gravel, porous stone or other material used to form the pressure blanket, and which might locally affect the normal rule that the pressure of a coherent liquid body is exerted equally in all directions and is the same at all points therein.

Since the normal construction of the primary and secondary liners 7 and 9 contemplates usage of compacted clay and similar soil materials, it is especially advantageous to provide structural sheets 26 and 27 to delimit the interfaces between the top and bottom boundary planes of the pressure blanket 10 and the adjacent boundary planes of the opposed primary and secondary liners 7 and 9. Any suitable conventional porous filter fabric or polymeric membrane material or the like may accordingly be used for such structural sheets so long as it is permeable to liquid flow therethrough, and possesses sufficient structural integrity and stability to prevent tearing or puncture under the static load conditions contemplated as well as resistance to chemical attack and otherwise deterioration from liquid leachate constituents, while at the same time being substantially impermeable to intrusion of soil fines from the compacted clay and similar materials used to form the liners 7 and 9.

Such structural sheets 26 and 27 which minimize entry of such foreign particulate materials into the permeable medium, thereby avoid otherwise eventual undesirable occlusion of the porous nature and condition of the pressure blanket 10 which would understandably detract from its intended performance. At the same time, these structural sheets permit the desired induced hydraulic intragradient to be achieved without difficulty.

In this regard, it should be noted that not only will the pressure blanket 10 in system 1 serve to prevent outward migration of liquid leachate from the secure landfill arrangement 2 through inner liner 7, but it will also prevent any underground water in the subsurface formation 6 from entering the secure landfill arrangement from below, should local subterranean conditions be such that an abnormal hydraulic gradient might temporarily occur in upward flow direction.

Since the secure landfill arrangement 2 will most often be situated in an open cavity 4 more or less at ground level 5, the regulation of the piezometric head in the pressure blanket 10 as well as the performance of the attendant related control functions associated with the operation and monitoring of the system 1 and the landfill site as a whole may be conveniently undertaken in either or both of the adjacent control pits 20 and 23, as desired. These control pits are preferably disposed at least partially below grade at ground level 5 and situated at opposite sides of the landfill arrangement 2, whereby to provide close access for regulation and monitoring of the piezometric head within the pressure blanket 10.

The major control functions which may be carried out at the pits 20 and/or 23, as the case may be, accordingly desirably contemplate, for example:

(a) monitoring of piezometric levels throughout the pressure blanket;

(b) facilities to allow control liquid, e.g. water, sampling and subsequent analysis from various selective local distribution points throughout the pressure blanket;

(c) flow meter means to record the required control liquid, e.g. feed water, inflow to the pressure blanket;

(d) emergency overflow means for use in the event the regulatory controls of the piezometric head malfunction and control liquid, e.g. water, in excess of that required is introduced into the pressure blanket; and (e) contingency facilities for large-scale withdrawal of control liquid, e.g. water, and/or contaminating liquid leachate, from the system in the event of the need for maintenance repair and/or in the unlikely event of failure of the pressure blanket.

Monitoring of piezometric levels throughout the pressure blanket is readily facilitated by the provision for the network of small diameter tubes 31 which serve to measure remotely the piezometric head at the respective termination points thereof within the system at which the sensing intake screen probes 33 are located. Since these tubes 31 are disposed within the network 28 of the perforated comparatively large diameter pipes 29, they may be correspondingly conducted through the associated headers and riser pipe sections of the network 28 of supply means 11 to a station conveniently situated at control pit 20, for example ending at a control board (not shown) constructed as a representation of the configuration of the pressure blanket simulating FIG. 1 and on which the manual valve fixtures 36 are mounted.

By use of the hand operated air pump 15 and the associated pressure gage 37 removably attached to each respective fixture 36, in turn, the piezometric head at the corresponding probe 33 may be conveniently and rapidly determined by measuring the air pressure necessary to counteract the piezometric head in conventional manner. Of course, a separate air pump and pressure gage arrangement may optionally be incorporated on such control board in fixed connection with each valve fixture 36, for corresponding individual determinations more or less at the same time without the need for detachably connecting a common pressure sensing means 15 or air pump and pressure gage to each such fixture 36 when a measurement is desired to be made.

Naturally, other specific means may be employed for determining the piezometric liquid pressure head or level at the various distribution points within the pressure blanket, as the artisan will appreciate.

The facilities to allow control liquid, especially water, sampling and subsequent analysis from various selective local distribution points throughout the pressure blanket conveniently also contemplate using the distal tube ends 35 at the fixtures 36 on the control board or the like. By the provision for an open tube end 35 or valve opening in fixture 36 or detachment of the corresponding sensing means 15, e.g. air pump and associated pressure gage 37, from such open tube end 35, samples of the control liquid such as water can be secured from throughout the pressure blanket via the particular intake probes 33.

For this purpose, it is generally only essential that the elevation of the upper or distal open tube ends 35 not be so far in height above any of the possible ranges of piezometric head involved, i.e. corresponding to piezometric level 12, that suction lift cannot be readily employed to withdraw the desired samples. Such may be accomplished by flow connecting a suitable manual suction pump (not shown) to the corresponding open tube end 35 at the fixture 36 of the tube 31 from which the sample is to be taken or at such valve opening in the fixture or upon detachment of the corresponding sensing means 15 from such fixture, as the case may be, whereupon the obtained sample may be chemically analyzed in conventional manner to determine its constituent content. This will indicate whether or not any liquid leachate contaminants are present therein, and in turn whether or not the system 1 is still operating properly.

A simple flow meter may be conveniently employed as flow sensing means 16 in the supply line of supply means 11 to record the required control liquid, especially feed water, inflow to the system 1. Since changes in inflow rate during operation of the system will immediately indicate the degree of integrity of the liners 7 and 9, advantageously the actual permeability of the primary liner 7 above the pressure blanket 10 and the secondary liner 9 below the pressure blanket may be routinely determined and monitored throughout the operational life of the secure landfill arrangement 2 in terms of such inflow rate.

The emergency overflow means 19 favorably provides back up control in the event the regulatory controls of the piezometric head for any reason should malfunction causing control liquid in excess of that required to be introduced into the pressure blanket 10. This will insure that excessively high and potentially detrimental piezometric heads will never build up in the pressure blanket, despite any possible failure in functioning of the main regulatory controls. Naturally, the capacity of the overflow means 19 provided should be greater than the greatest contemplated or conceivable inflow rate to the system 1 through the supply means 11.

Contingency facilities for large-scale withdrawal of control liquid, especially water, and/or contaminating liquid leachate, from the system 1 in the event of maintenance repair and/or failure of the pressure blanket 10 are favorably provided by the outlet access means 18 at the open end of access standpipe 22, since the same will readily accomodate a pump for achieving operative flow communication with the supply means 11. In this regard, such withdrawal may be provided as a submersible pump (not shown) which may be introduced via the standpipe 22 into the supply means 11 for withdrawing liquid from the pressure blanket in conventional manner. In this way, apart from any temporary withdrawal of control liquid for maintenance repair purposes, the pressure envelope constituted by the pressure blanket 10 may be converted in effect to a more or less permanent secondary liquid leachate collection system in the event of some irreparable failure or damage to the primary liner 7 or to the piezometric pressure blanket 10 itself.

It will therefore be seen that the present invention also contemplates an induced hydraulic intragradient concept method of preventing flow migration of liquid leachate from the secure landfill arrangement 2. Such method involves the steps of maintaining the low permeability inner primary layer or liner 7 for confining liquid leachate containing waste material landfill and the low permeability outer secondary layer or liner 9 for confining such primary liner 7 as well as for separating the arrangement 2 from the surrounding subsurface formation 6 thereat, whereby to provide the secure landfill arrangement 2, along with separating of the liners 7 and 9 from each other by maintaining the intermediate highly permeable piezometric pressure blanket 10 therebetween.

In turn, such method contemplates the further step of supplying sufficient control liquid to the pressure blanket 10 via the supply means 11 to maintain selectively the piezometric level 12 therein higher than the corresponding level 13 of any leachate accumulation in the waste material confined within the inner layer or liner 7, for induced hydraulic intragradient counterflow migration of control liquid, especially potable water from a convenient source, from the pressure blanket inwardly through the inner liner. In this manner, flow migration will be prevented of such leachate outwardly through the inner liner 7 and in turn to and through the outer liner 9 to the surrounding subsurface formation 6.

By periodically determining the piezometric liquid pressure head or level in the pressure blanket as noted above, the desired induced hydraulic intragradient counterflow migration may be readily monitored. Likewise, by periodically or continuously measuring or determining the ongoing flow rate of the control liquid supplied to the pressure blanket and any changes therein, the degree of impermeability of the liners 7 and 9 may be effectively monitored. Furthermore, by periodically sampling and testing the liquid in the pressure blanket for the presence of leachate therein, the possible migration of leachate outwardly through the inner liner 7 may be safely monitored.

It will be realized, of course, that only that amount of control liquid need be periodically supplied via pressure pump 17 to supply means 11 to make up for the incremental amount of such liquid which actually migrates outwardly from the pressure blanket 10 upwardly through the inner liner 7 and downwardly through the outer liner 9, as the case may be, and so as to maintain the piezometric level 12 of the control liquid surface 14 at the desired height above the liquid leachate level 13 for induced hydraulic intragradient positive counterflow migration of such control liquid from the pressure blanket inwardly through the inner liner.

While optionally a threshold pressure actuated check valve (not shown) may be provided in emergency overflow means 19 and a removable closure element or cover (not shown) on the outlet access means 18 to seal the system, i.e. where the valve fixtures 36 are likewise maintained in closed off condition, thereby permitting the control liquid in the pressure blanket 10 to be maintained under positive induced extraneous pressure generated by the feed pressure of the pressure pump 17, this will normally not be needed for system 1 to operated in the desired manner. Instead, the body of control liquid in the pressure blanket 10 will serve to achieve the positive counterflow migration sought merely by reason of its piezometric head as compared with the head of any liquid leachate accummulation above inner liner 7 and any corresponding piezometric head acting upwardly through outer liner 9.

Because the system is not exposed to view due to the very nature of its sandwich construction, indirect means for ascertaining the systems internal piezometric head must be utilized. This is basically accomplished by pressure sensing means 15 and flow sensing means 16.

Of course, the upper surface of the waste material deposit in the secure landfill arrangement 2 may be suitably covered or sealed over by an appropriate further covering material or layer (not shown) in conventional manner, as and if desired, as the artisan will appreciate.

It will be appreciated that the foregoing specification and accompanying drawings are set forth by way of illustration and not limitation, and that various modifications and changes may be made therein without departing from the spirit and scope of the present invention and changes may be made therein without departing from the spirit and scope of the present invention which is to be limited solely by the scope of the appended claims.

What is claimed is:

1. Induced hydraulic intragradient system for secure landfill arrangement comprising
 a low permeability inner primary liner for confining liquid leachate containing waste material landfill and a low permeability outer secondary liner for confining the primary liner and for separating the arrangement from the surrounding subsurface formation thereat,
 an intermediate permeable piezometric pressure blanket separating the liners from each other, and
 control liquid supply means for supplying sufficient control liquid to the pressure blanket to maintain selectively the piezometric head therein higher than the corresponding piezometric head of any leachate accumulation in the waste material confined within the inner liner, for induced hydraulic intragradient counterflow migration of control liquid from the pressure blanket inwardly through the inner liner, whereby to prevent flow migration of such leachate outwardly through the inner liner and in turn to and through the outer liner to the surrounding subsurface formation.

2. System according to claim 1 wherein pressure sensing means are provided for determining the piezometric liquid pressure head in the pressure blanket.

3. System according to claim 1 wherein flow sensing means are provided for measuring the flow rate of control liquid supplied to the pressure blanket.

4. System according to claim 1 wherein the supply means are provided with pressure pumping means for supplying control liquid to the pressure blanket.

5. System according to claim 1 wherein the supply means are provided with outlet access means for removing liquid from the pressure blanket.

6. System according to claim 1 wherein overflow conduit means are provided for conducting excess liquid from the pressure blanket.

7. System according to claim 1 wherein the system is disposed along the surface of an open cavity substantially at ground level and overlies the surrounding subsurface formation thereat.

8. System according to claim 1 wherein the pressure blanket is composed of openly packed substantially inert particles forming a structurally stable load bearing permeable medium between the liners sufficient for supporting the landfill arrangement and primary liner stationarily thereon.

9. System according to claim 8 wherein a liquid permeable and solids retaining inner structural sheet is interposed between the inert particles and the inner liner and a liquid permeable and solids retaining outer structural sheet is interposed between the inert particles and the outer liner to minimize entry of any solids material from the liners into the permeable medium.

10. System according to claim 9 wherein the supply means includes a flow distribution network of perforated pipes disposed within the pressure blanket for supplying control liquid locally throughout the extent of the permeable medium.

11. System according to claim 10 wherein tubes of substantially smaller diameter than the perforated pipes are disposed within such pipes and correspondingly terminate at one tube end thereof projecting outwardly through such pipes in pressure sensing means situated at selective distribution points within the pressure blanket and correspondingly terminate at the opposite tube end thereof in pressure communicating means situated at an external control location remote from the pressure blanket for respectively determining the piezometric liquid pressure head at such distribution points within the pressure blanket.

12. Induced hydraulic intragradient method of preventing flow migration of liquid leachate from a secure landfill arrangement comprising maintaining a highly impermeable inner primary liner for confining liquid leachate containing waste material landfill and a highly impermeable outer secondary liner for confining the primary liner and for separating the arrangement from the surrounding subsurface formation thereat, whereby to provide a secure landfill arrangement, separating the liners from each other by maintaining an intermediate highly permeable piezometric pressure blanket therebetween, and supplying sufficient control liquid to the pressure blanket to maintain selectively the piezometric head therein higher than the corresponding piezometric head of any leachate accumulation in the waste material confined within the inner liner, for induced hydraulic intragradient counterflow migration of control liquid from the pressure blanket inwardly through the inner liner, whereby to prevent flow migration of such leachate outwardly through the inner liner and in turn to and through the outer liner to the surrounding subsurface formation.

13. Method according to claim 12 wherein the control liquid is potable water.

14. Method according to claim 12 wherein the piezometric head in the pressure blanket is periodically determined for monitoring such induced hydraulic intragradient counterflow migration.

15. Method according to claim 12 wherein the flow rate of the control liquid supplied to the pressure blanket is measured for monitoring the degree of impermeability of the liners.

16. Method according to claim 12 wherein the liquid in the pressure blanket is periodically sampled for testing for the presence of leachate therein for monitoring migration of leachate outwardly through the inner liner.

* * * * *